(12) United States Patent
Searl et al.

(10) Patent No.: US 12,470,073 B2
(45) Date of Patent: Nov. 11, 2025

(54) SYSTEM FOR IDENTIFYING A BATTERY BASED ON A COLOR OF A PART OF THE BATTERY

(71) Applicant: CPS Technology Holdings LLC, New York, NY (US)

(72) Inventors: Jason David Searl, Bayside, WI (US); Kathryn Marie Ciurlik, Racine, WI (US); Trish T. Haudricourt, Williamsburg, VA (US); Kathryn Ann Campbell, Whitefish Bay, WI (US)

(73) Assignee: CPS Technology Holdings LLC, New York, NY (US)

( * ) Notice: Subject to any disclaimer, the term of this patent is extended or adjusted under 35 U.S.C. 154(b) by 396 days.

(21) Appl. No.: 17/749,898

(22) Filed: May 20, 2022

(65) Prior Publication Data
US 2022/0373394 A1    Nov. 24, 2022

Related U.S. Application Data

(60) Provisional application No. 63/196,855, filed on Jun. 4, 2021, provisional application No. 63/191,687, filed on May 21, 2021.

(51) Int. Cl.
*H02J 7/00* (2006.01)

(52) U.S. Cl.
CPC ................. *H02J 7/00043* (2020.01)

(58) Field of Classification Search
CPC ................. H02J 7/00043; G01J 3/46
See application file for complete search history.

(56) References Cited

U.S. PATENT DOCUMENTS

| | | | | |
|---|---|---|---|---|
| 4,638,237 A | * | 1/1987 | Fernandez | H02J 7/005 320/DIG. 21 |
| 5,651,821 A | * | 7/1997 | Uchida | H02J 7/0045 588/259 |
| 2012/0156551 A1 | | 6/2012 | Cho | |
| 2015/0162649 A1 | * | 6/2015 | Bae | H01M 10/488 429/91 |
| 2017/0092902 A1 | | 3/2017 | Ueda et al. | |

(Continued)

FOREIGN PATENT DOCUMENTS

| | | | |
|---|---|---|---|
| CN | 203580679 U | * | 5/2014 |
| JP | 2003017028 A | * | 1/2003 |

OTHER PUBLICATIONS

Advance Auto Parts: Car, Engine, Batteries, Brakes, Replacement, Performances & Accessories; May 20, 2022 consisting of 19-pages.

(Continued)

*Primary Examiner* — Minh Q Phan
(74) *Attorney, Agent, or Firm* — Weisberg I.P. Law, P.A.

(57) ABSTRACT

Battery life cycle management is facilited with distinct visual cues of colors and color-coded combinations. The color-codes enable battery types and characteristics over the course of the life of the battery to be determined. The color-codes are based on a color system that indicates a performance rating of the batteries. A system for managing the color-coded batteries selects color-coded batteries for use based upon color, maintaining color based functionality, and color-coded battery indication for destruction of the battery at the end of its life cycle.

20 Claims, 14 Drawing Sheets
(8 of 14 Drawing Sheet(s) Filed in Color)

(56) References Cited

U.S. PATENT DOCUMENTS

2020/0052286 A1    2/2020    Johns et al.

OTHER PUBLICATIONS

Hearing Aid Batteries: Professional Hearing Center: Audiologists; May 20, 2022 consisting of 6-pages.
International Search Report and Written Opinion dated Nov. 11, 2022 for International Application No. PCT/US2022/030398 filed May 20, 2022, consisting of 11 pages.

* cited by examiner

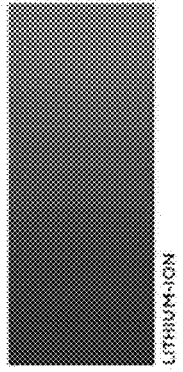
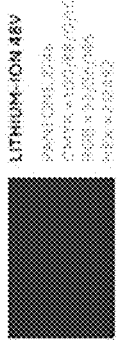
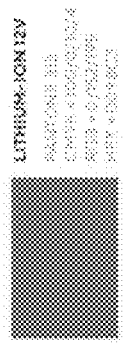
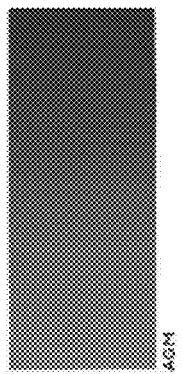
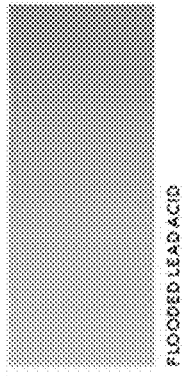
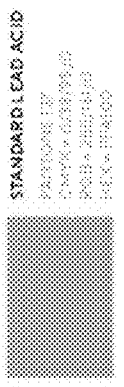
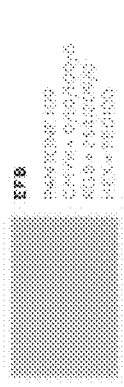
FIG. 7

SYSTEM FOR IDENTIFYING A BATTERY BASED ON A COLOR OF A PART OF THE BATTERY

CROSS-REFERENCE TO RELATED PATENT APPLICATIONS

This application is related to and claims priority to U.S. Provisional Patent Application Ser. No. 63/191,687, filed May 21, 2021, entitled SYSTEM FOR IDENTIFYING A BATTERY BASED ON A COLOR OF A PART OF THE BATTERY and U.S. Provisional Patent Application Ser. No. 63/196,855, filed Jun. 4, 2021, entitled SYSTEM FOR IDENTIFYING A BATTERY BASED ON A COLOR OF A PART OF THE BATTERY, the entireties of both which are incorporated herein by reference.

BACKGROUND

Global management of vehicle batteries remains complex. Clarios LLC is a global leader of vehicle batteries, manufacturing millions of vehicle batteries a year. Clarios has taken a global lead in the proper design, use and disposal of these vehicle batteries to provide reliable safe and efficient life cycle management. With its expertise in battery application and the systems that rely on these applications, Clarios embodies its powering today, into tomorrow approach to global battery supply. In vehicle battery technology various types of lead-acid and lithium-ion batteries are used in electrical systems, such as an electrical system of or part of a vehicle. The batteries may vary in size, shape, battery chemistry, and amp hours. Often, only certain batteries are suitable for any given vehicle or other application. It is important that a user selects an appropriate battery for a particular application. However, once a battery has been selected, monitoring performance characteristics, such as available remaining life of a battery is difficult. Further, in processing centers that handle large numbers of batteries, there are no methods or systems of readily segregating batteries by performance characteristics or battery type for specific processing such as destruction or recycling. In facilities that handle mixed battery types such as lead-acid and lithium-ion batteries, errors in selection of batteries for specific processes can be dangerous.

SUMMARY

A system for managing color-coded batteries is provided having a processor configured to select a color-coded battery for use based upon color, monitor the life cycle of the color-coded battery based upon color, and select a color-coded battery for destruction based upon color. In the selection step, user requirements are identified and color-coded batteries having color associated specific battery use are provided. A selection algorithm selects a specific color-coded battery that meets the user requirements. The system monitors the life cycle of the batteries by identifying a battery value to be monitored and monitoring the battery value, wherein the batteries display a color-code corresponding to the battery value.

The batteries can include at least two lead-acid cells and wherein monitoring the battery value includes individually monitoring the at least two lead-acid cells to provide a cell value for each lead-acid cell. A color-code can be assigned to each of the cells and displayed according to each cell value. Alternatively, the cell values of each lead-acid cell can be used to display a single color-code for the battery.

The system selects color-coded batteries for end-of-life processing by determining a processing step based upon color-code, identifying a color-coded battery from a group of color-coded batteries, and performing a processing step for the color-coded battery that can include step separating the identified color-coded battery form the group of color-coded batteries. The identified color-coded battery can be directed a disposal or a recycling station.

The system further includes an optical sensor in communication with the processor, wherein the optical sensor is configured to identify a single color or more than one color, wherein color indicates a specific color-coded battery model, the presence of specific color-coded battery components, and/or a calendar date. The calendar date can indicate color-coded battery end of useful life date.

Additionally, the color-coding can transition from a first color to a second color, wherein the first and second colors correspond to different battery values. The battery values can correspond to an electrochemical state of the color-coded battery that changes over time and/or a chronological age of the color-coded battery. The color can fade in intensity corresponding to a change in the battery value.

With respect to the batteries, the battery can be provided with a cover and a case, the cover having a first color different from a second color of the case, wherein the first color indicates a type of the battery.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various examples of embodiments of the systems, devices, and methods according to this invention will be described in detail, with reference to the following figures.

FIG. 7 is an alternative depiction of the color system depicted in FIG. 6.

Figure 1:
FIG. 1 illustrates a color-coded battery in accordance with the invention.

The drawings are not necessarily to scale. In certain instances, details that are not necessary to the understanding of the invention or render other details difficult to perceive may have been omitted. It should be understood, of course, that the invention is not necessarily limited to the embodiments illustrated herein.

DETAILED DESCRIPTION

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of vehicles, including gas- or diesel-powered vehicles (land, marine, or air) as well as electric vehicles (xEVs) and other high voltage energy storage/expending applications (e.g., electrical grid power storage systems). Such battery systems may include one or more battery modules, each battery module having several battery cells (e.g., lead acid or lithium-ion (Li-ion) electrochemical cells) arranged to provide particular voltages and/or currents useful to power, for example, one or more components of a particularly designed vehicle as a primary energy source for ignition or a secondary energy source for redundant or emergency power of safety or critical vehicle systems. As another example, battery modules in accordance with present embodiments may be incorporated with or provide power to stationary power systems (e.g., non-automotive systems). In some examples, the battery may be any type of lead-acid battery, including for example, industrial or back-up batteries, as well as other types of lead-acid batteries. The example batteries are electrically coupled to the vehicle via terminals (e.g., a negative terminal and a positive terminal).

In accordance with embodiments of the present disclosure, a battery module includes electrochemical cells, a housing configured to retain or hold the electrochemical cells, and one or more covers configured to be disposed over an open side of the housing to seal the housing. Further, the battery module may include a bus bar carrier disposed within the housing and over the electrochemical cells (e.g., between the electrochemical cells and a cover of the battery module) that retains bus bars of the battery module and includes other features in accordance with embodiments of the present disclosure. For example, the bus bar carrier may include one or more flexible fingers extending toward the electrochemical cells and configured to exert a force against the electrochemical cells. Further, certain of the fingers may include a cavity configured to receive a sensor that senses operating conditions (e.g., voltage and/or temperature) of the battery module (or electrochemical cells thereof). For example, the sensor may be sandwiched between a bottom surface defining at least a portion of the cavity of the finger and a corresponding one of the electrochemical cells. The finger(s) having the cavity may also include an opening disposed adjacent to the cavity to enable a lead to extend from the sensor (e.g., proximate to the bottom surface of the finger), though the opening, and above a top surface of the finger opposite to the bottom surface of the finger.

Referring now to the drawing figures in which like reference designators refer to like elements, there is shown in FIG. 1 a color-coded battery 12 in accordance with the invention. The role and placement of the color-coded battery in a vehicle will be discussed followed by a discussion of the structural elements of batteries. Then, a color-coding system is described long with the functionality of the color-coding. Finally, a discussion of a system for selecting, monitoring, and processing color-coded batteries is provided.

Figure 2:
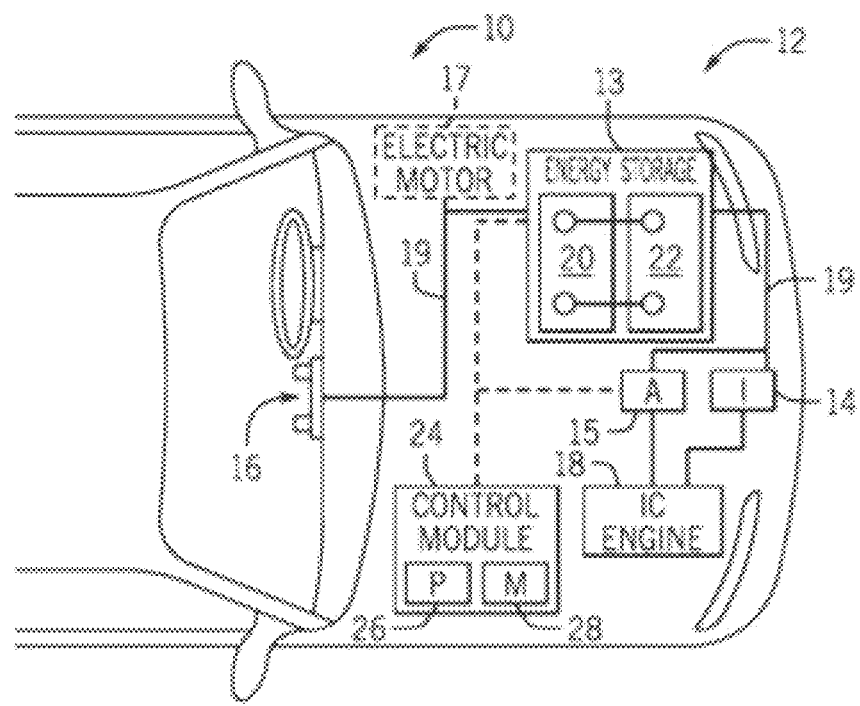
FIG. 2 is a cutaway schematic view of an embodiment of the vehicle and the battery system of FIG. 1, in accordance with an aspect of the present disclosure.

Referring to FIG. 2, the color-coded battery 12 described herein may be positioned within the vehicle. The color-coded battery 12 (alternately referred to as a "battery system," intended to include components that are part of the battery, but not necessarily the energy storing components) can be placed in a location in the vehicle 10 that traditionally houses a battery system. For example, as illustrated, the vehicle 10 may include the battery system 12 under the hood of the vehicle 10. Furthermore, as will be described in more detail below, the battery system 12 may be positioned to facilitate, managing temperature of the battery system 12. For example, in some embodiments, positioning a battery system 12 under the hood of the vehicle 10 may enable an air duct to channel airflow over the battery system 12 and cool the battery system 12.

As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10. In other words, the battery system 12 may supply power to components of the vehicle's electrical system, which may include radiator cooling fans, climate control systems, electric power steering systems, active suspension systems, auto park systems, electric oil pumps, electric superchargers: electric water pumps, heated windscreen defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 15.

Additionally, the energy storage component 13 may capture electrical energy generated by the alternator 15 and/or the electric motor 17. in some embodiments, the alternator 15 may generate electrical energy while the internal combustion engine 18 is running. More specifically, the alternator 15 may convert the mechanical energy produced by the rotation of the internal combustion engine 18 into electrical energy. Additionally, or alternatively, when the vehicle 10 includes an electric motor 17, the electric motor 17 may generate electrical energy by converting mechanical energy produced by the movement of the vehicle (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus. For example, the bus may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12-volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium-ion battery module 20 and lead-acid battery module 22 are depicted adjacent to one another, they may be positioned in different areas around the vehicle. For example, the lead-acid battery module 22 may be positioned in or about the interior of the vehicle 10 while the lithium-ion battery module 20 may be positioned under the hood of the vehicle 10.

In some embodiments, the energy storage component 13 may include multiple battery modules to utilize multiple different battery chemistries. For example, when the lithium-ion battery module 20 is used, performance of the battery system 12 may be improved since the lithium-ion battery chemistry generally has a higher coulombic efficiency and/ or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 1 may additionally include a control module 24. More specifically, the control module 24 may control operations of components in the battery system 12, such as relays (e.g., switches) within, energy storage component 13, the alternator 15, and/or the electric motor 17. For example, the control module 24 may regulate amount of electrical energy captured/supplied by each battery module 20 (e.g., to de-rate the battery system 12), perform load balancing between the battery modules 20 and 22, determine a state of charge of each battery module 20 or 22, determine temperature of each battery' module 20 or 22. control voltage output by the alternator 15 and/or the electric motor 17, and the like.

Accordingly, the control module 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random-access memory (RAM), and/or non-volatile memory, such read-only memory (ROM), optical drives, hard disc drives, or solid-state drives. In some embodiments, the control module 24 may include portions of a vehicle control unit (VCU) and/or a separate battery control module.

Figure 3:
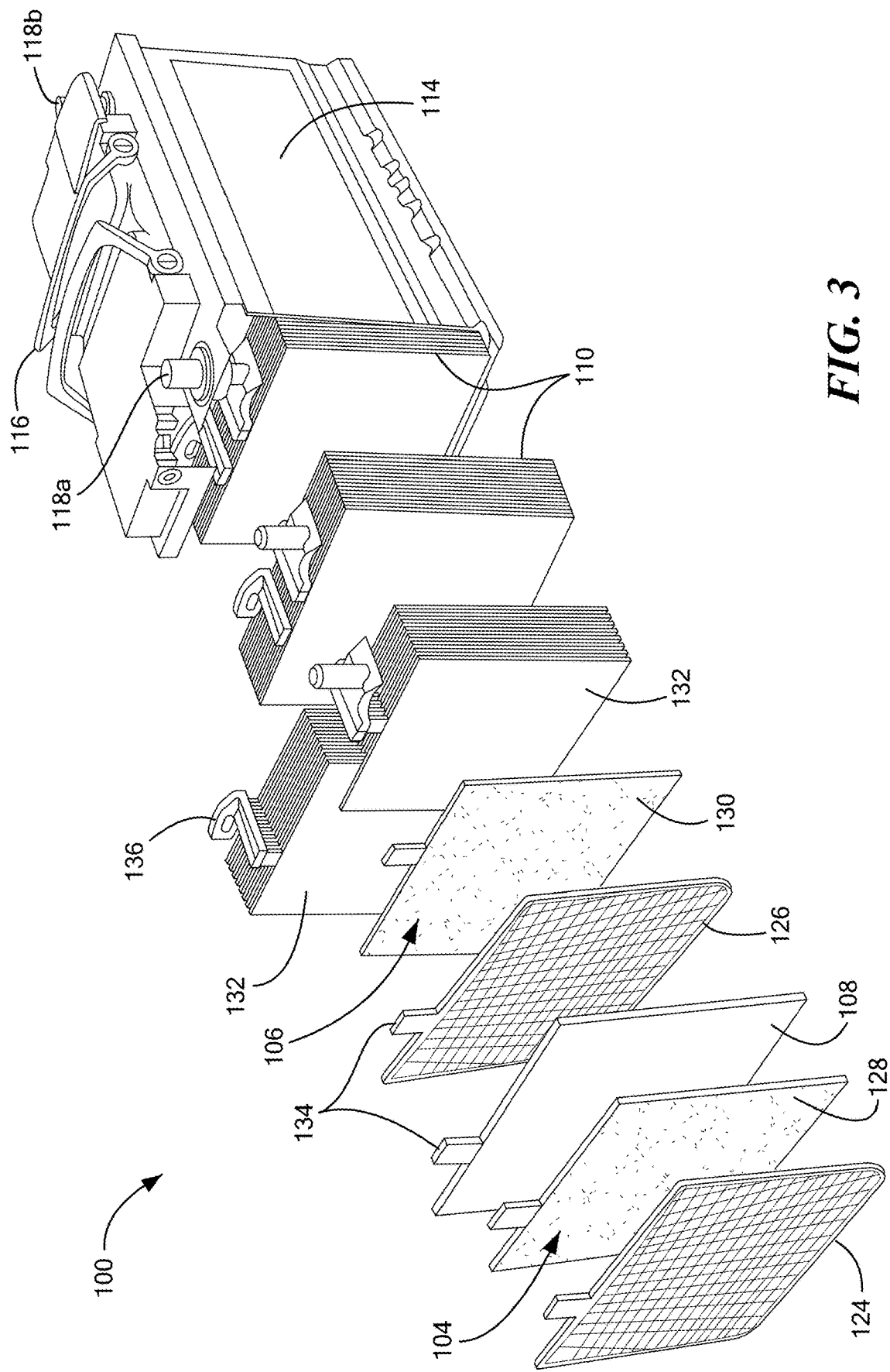
FIG. 3 is an exploded perspective view of one of the lead-acid batteries described herein.

While a vehicle battery is shown and described, the disclosure and system described herein are not limited thereto. Referring to FIG. 3, the example battery is a lead-acid battery with an absorbent glass mat. The lead-acid battery is composed of a housing or container which includes a cover 116. The cover 116 is provided for the container or housing 114 and may be sealed to the housing 114. In various embodiments, the housing 114 and/or cover 116 includes battery terminals 118a, b. The battery is electrically coupled to the vehicle via the terminals. The battery cover 116 may also include one or more filler hole caps and/or vent assemblies 120. The housing 114 and cover 116 may be primarily composed of a polymer material. In one or more examples of embodiments, the polymer material may be a recycled polymer material. An electrolyte, which typically comprises sulfuric acid, may be included in the battery within the housing 114.

Within the housing 114 are positive and negative electrodes or plates 104, 106. Referring to FIG. 3, the electrodes 104, 106 include electrically conductive positive or negative current collectors or substrates or grids 124, 126 or current collector 1001 as discussed in further detail herein. To this end, a "grid" or "current collector" may include any type of mechanical or physical support or substrate for the active material. Positive paste or electrochemically active material 128 is provided in contact with and/or on the positive grid 124 and negative paste or electrochemically active material 130 is provided on the negative grid 126. A separator 108 is positioned between the positive and negative electrodes or plates 104, 106. In a retained electrolyte-type battery 100, the separator 108 may be a porous and absorbent glass mat (AGM). In one or more examples of embodiments, the lead-acid battery herein is an AGM lead-acid battery.

As shown in FIG. 3, a plurality of positive electrodes or plates 104 and a plurality of negative electrodes or plates 106 (with separators 108) generally make up at least a portion of the electrochemical cell 110. Referring to FIG. 3, a plurality of plate or electrode sets or books or cell elements 110 may be electrically connected (e.g., electrically coupled in series or other configuration) according to the capacity of the lead-acid storage battery.

The plurality of positive electrodes or plates 104 and negative electrodes or plates 106 may be provided in stacks or sets or cell elements 110 for producing a battery 100 having a predetermined voltage, as one example, a 12-volt battery, in the vehicle 102. The number of cell elements 110 or groups or sets may be varied. It will also be obvious to those skilled in the art after reading this specification that the size and number of electrodes 104 and/or 106 in any particular group (including the size and number of the individual current collectors). The number of groups used to construct the battery may vary depending upon the desired end use.

In an AGM lead-acid battery which includes several cell elements 110 provided in one or more separate compartments 112 of a container or housing 114, the element stack 110 may be compressed during insertion reducing the thickness of the separator 108.

As shown in FIG. 3, each current collector has a lug 134. One or more cast-on straps or intercell connectors 136 are provided which electrically couple the lugs 134 of like polarity in an electrode or plate set or cell element 110 and to connect other respective sets or cell elements 110 in the battery. The connection of the elements may be a single element, parallel connection (capacity doubled, voltage the same) or series connection (e.g., voltages are additive (i.e., 4V, 6V, etc.) with the same capacity). One or more positive terminal posts 118a and one or more negative terminal posts 118b, as shown in FIG. 3, may also be provided, electrically coupled to the cell elements 110. Such terminal posts typically include portions which may extend through the cover and/or container wall, depending upon the battery design. It will be recognized that a variety of terminal arrangements are possible, including top, side, front or corner configurations known in the art. The intercell connectors 136 and/or terminals 118a, b may be composed of lead or lead alloy. In one or more examples the lead may be a recycled lead.

Figure 4:
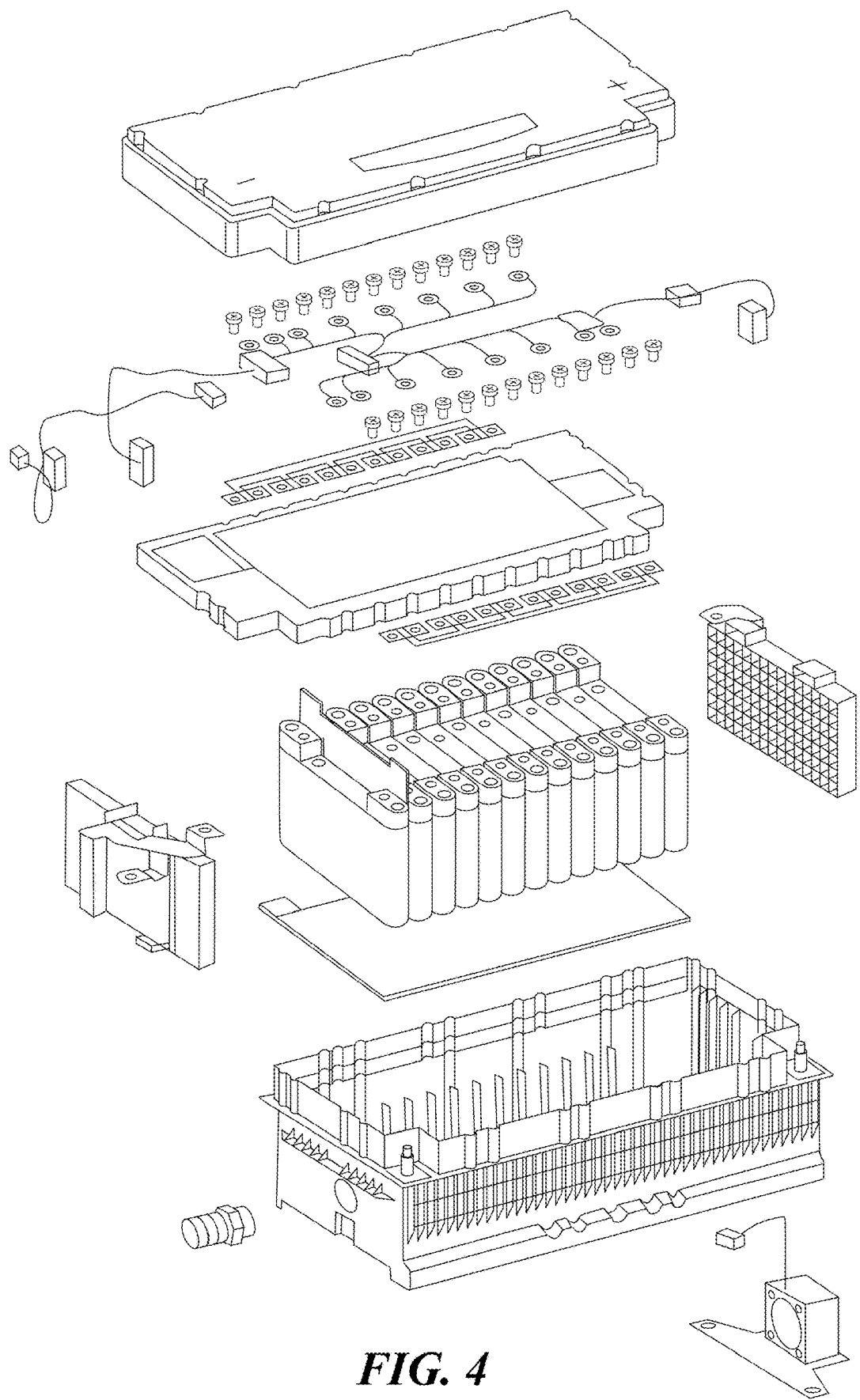
FIG. 4 is an exploded perspective view of one of the lithium-ion batteries described herein.

FIG. 4 is an exploded perspective view of one of the example lithium-ion batteries described herein. As shown in FIG. 4, in addition to the upper cover and the housing, the battery pack further comprises several battery cells, a bearing plate, a first end plate, a second end plate, and a harness. The several battery cells are sequentially arrayed and mounted in the housing. The first end plate and the second end plate are disposed at two end sides of the several mounted battery cells, respectively, to laterally secure the several mounted battery cells. The bearing plate is disposed above the several mounted battery cells, and the harness is borne by the bearing plate. The battery pack may optionally further comprise a fan assembly. In addition, a gas discharging nozzle is also mounted on a side wall of the housing. A partition plate is provided between every two adjacent battery cells, to partition off two adjacent battery cells. A heat dissipation pad is provided beneath the several battery cells, to conduct out heat generated by the several battery cells. The battery pack further comprises several battery cell bus bars that are secured on the cathodes and anodes of the battery cells through battery cell fasteners, thereby serially connecting two adjacent battery cells. The harness may include a harness first segment, a harness second segment, a harness third segment, and a harness fourth segment.

Figure 5:
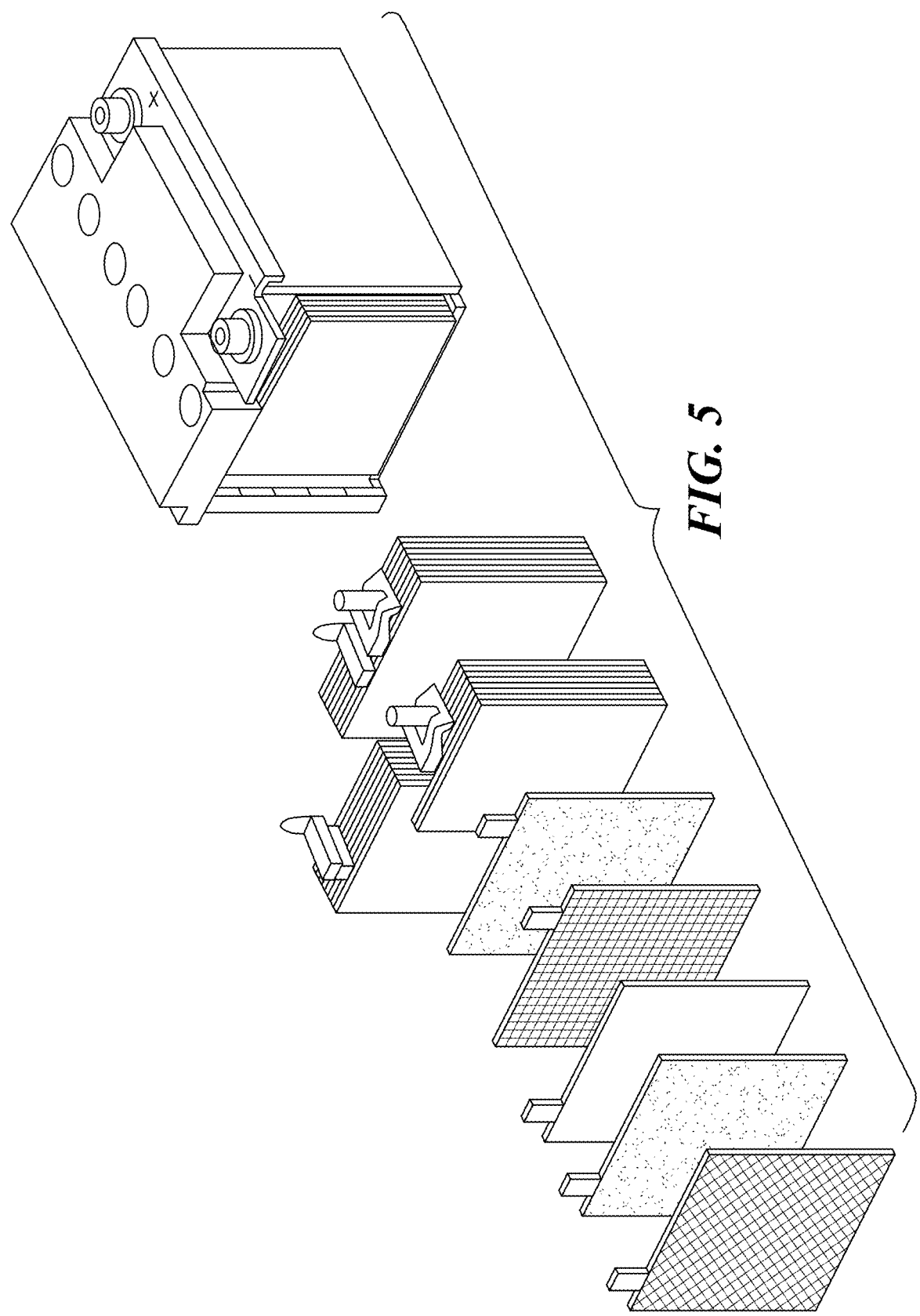
FIG. 5 is an exploded perspective view of one of the flooded batteries described herein.

A flooded battery is shown in an exploded view in FIG. 5. The flooded battery may include any type of secondary battery (e.g., rechargeable battery). According to one or more examples of embodiments, the battery is a lead-acid storage battery. Various embodiments of lead-acid storage batteries may be either sealed (e.g., non-maintenance) or unsealed (e.g., wet). According to one or more examples of embodiments, the lead-acid storage battery is an unsealed lead-acid battery and periodically requires the addition of electrolyte and/or water to maintain a desired volume and/or concentration of either or both. The battery, in one or more alternative examples of embodiments, may be of the SLI-type. The battery may alternatively be an absorbed glass mat battery. While specific examples are described and illustrated, any suitable secondary battery may be acceptable for the purposes provided.

The lead-acid storage battery includes several cell elements which are provided in separate compartments of a container or housing containing electrolyte, such as aqueous sulfuric acid. A cover is provided for the housing, and in various embodiments, the cover includes terminal bushings and fill tubes to allow electrolyte to be added to the cells and to permit servicing. To prevent undesirable spillage of electrolyte from the fill tubes, and to permit exhausting of gases generated during the electrochemical reaction, a battery housing or cover may also include one or more filler hole caps and/or vent cap assemblies.

The illustration provided herein for purposes of example relates to automotive applications, wherein groups of 8-20 plates are used in each of six stacks or plate sets, both positive and negative, for producing a standard automotive 12-volt battery. Each plate block may include one or more positive plates and one or more negative plates, each having a lug. Separator material is provided between each positive plate and negative plate. A plurality of plate blocks or chapters or cells are connected in series according to the capacity of the lead storage battery. In other applications, anywhere from 6 to 31 plates may be used in a stack. The number of stacks or chapters or plate sets may be varied as well. It will be obvious to those skilled in the art after reading this specification that the size and number of plates in any particular stack (including the size and number of the individual grids), and the number of stacks used to construct the battery may vary widely depending upon the desired end use.

One or more positive and one or more negative terminal posts may be provided. Such terminal posts typically include portions which may extend through the cover and/or housing, depending upon the battery design. The terminal posts may also extend through a terminal post seal assembly to help prevent leakage of acid. It will be recognized that a variety of terminal arrangements are possible, including top, side or corner configurations known in the art. One or more cast-on straps which electrically couple the lugs in a plate set and the respective plate sets may also be provided.

As indicated, the battery includes a positive plate and a negative. Each plate includes a lead or lead alloy grid that supports an electrochemically active material. In the illustrated examples of embodiments, the positive and negative plates are paste-type electrodes. The paste-type electrode includes the grid as described herein which forms a substrate and an electrochemically active material or "paste" provided on the substrate. The grids, including a positive grid as described in detail herein above, and a negative grid, provide an electrical contact between the positive and negative active materials or paste which serves to conduct current.

In the illustrated examples, a system for easily identifying a battery is described. In particular, the system allows a battery to be identified based on an indicating feature so that a user can quickly identify a replacement battery without needing to read the information about the replacement battery or the battery that is being replaced. In the example system described herein, the indicating feature of the battery is color-coded based in a type and/or other characteristic of the battery. The feature may include a cover of the battery, a base of the battery, a label affixed to the battery, one or more portions of housing of the battery (e.g., corners of the housing), etc. The example batteries described herein each include a color-coded cover and a corresponding label, but any of the other features may be color-coded in addition to or instead of the battery cover and label.

Figure 6:
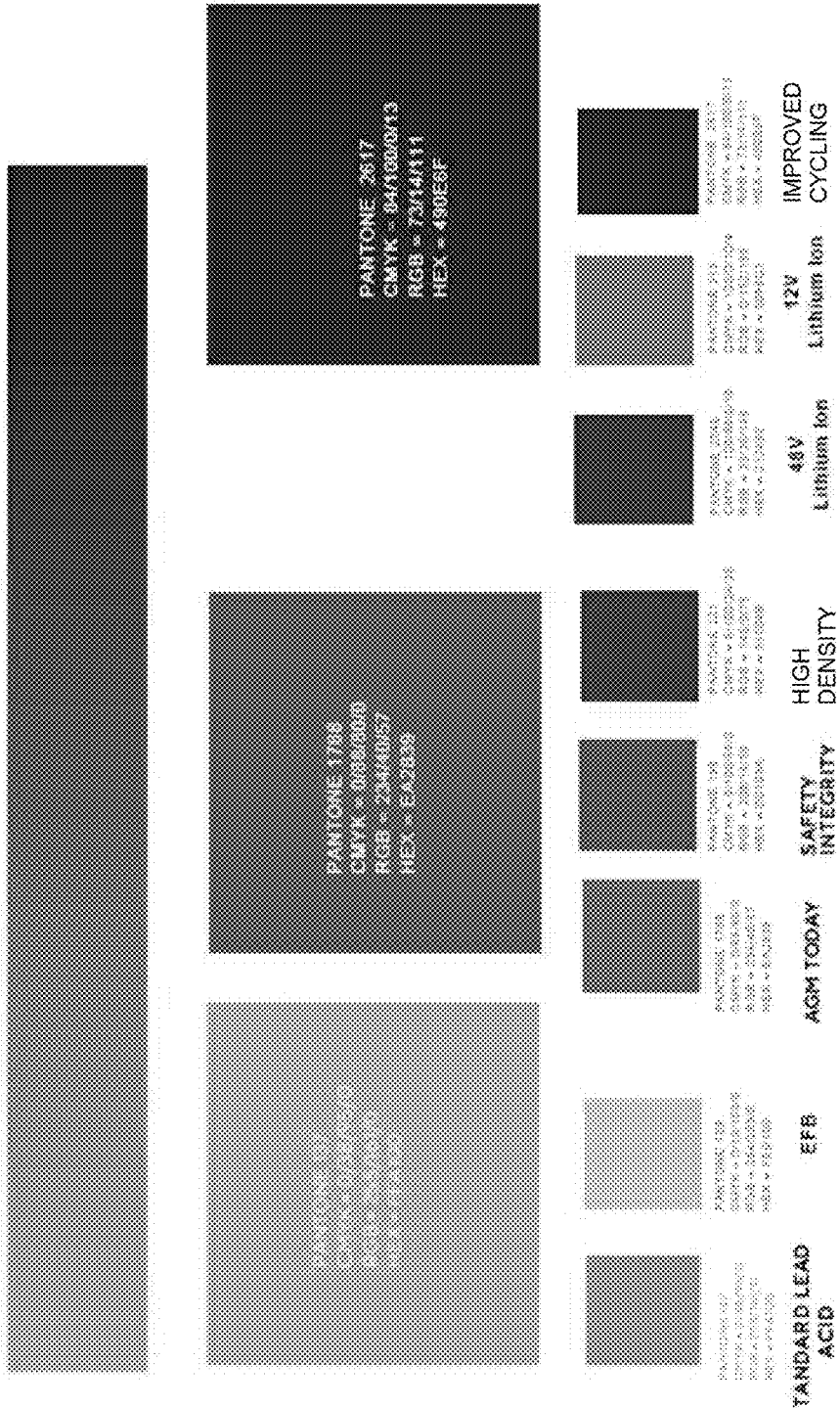
FIG. 6 depicts an example color system for a product portfolio.
Figure 8:
FIG. 8 depicts a first construction of a battery having a cover based on the color system of FIGS. 6 and 7.
Figure 9:
FIG. 9 depicts an alternative view of the first construction of the battery of FIG. 8.

FIGS. 6 and 7 depict a color system that may be used as a product portfolio color system that includes a color corresponding to each product in the portfolio. In the system described herein, a first example battery of a first type may have a feature (e.g., a cover, a label) of a first color. The first color of the cover corresponds to the type of the first battery. Thus, the first color indicates the type of the first battery (e.g., to a user, a sales associate, a service associate, a technician, a repair shop, etc.). A second type of battery has a feature (e.g., a cover, a label) of a second color. The second color corresponds to the type of the second battery. Thus, the second color indicates the type of the second battery (e.g., to a user, a sales associate, a service associate, a technician, a repair shop, etc.). It may be advantageous that the color-coded feature is consistent throughout a product portfolio (e.g., the feature that is color-coded for a battery made by, for example, a particular manufacturer, is the same feature that is color-coded on all batteries made by the manufacturer) so that a user may easily identify what feature of the battery is significant for determining the type of battery. Specifically, in the example system illustrated herein, the covers and labels of the batteries is color-coded. In alternative examples, the base of the housing (or any other feature) of the batteries may be color-coded). Additionally, the color system may be used for other material related to the product portfolio, such as informational sheets.

The example color-coding system uses an example color spectrum that corresponds to the color palette of, for example, a company and used with the product portfolio of batteries described herein. Additionally, the example color spectrum corresponds to a color scheme or color spectrum used with logos, company branding, literature, sell sheets, or other marketing materials created and distributed by the user (e.g., a company) of the example color spectrum. The example color spectrum described herein is only one example color spectrum that may be implemented with a product portfolio, particularly a product portfolio having multiple product ranges and multiple products within each range. For example, the product portfolio described herein includes three different product ranges, and different individual products or product lines within each product range. Thus, the example color spectrum includes three color ranges. Each of the three-color ranges corresponds to one of the three product ranges. A shade within each color range corresponds to a product within each product range. Because each product is assigned a shade within the color range corresponding to the product range, a new product can easily be introduced and assigned an appropriate shade (e.g., based on the performance rating, product range, introduction date, etc.) within correct color range. Thus, the color spectrum for the product portfolio allows for growth of the product portfolio as needed. Other example color spectrums may include a different number or ranges based on the product range to which the color-coding is applied.

The color ranges and/or the shades used within each color range may be selected based on, for example, a performance rating of the battery. The performance of each battery in the product portfolio may be determined using a number of factors. In some examples, the factors may include fuel efficiency/carbon dioxide reduction, charge acceptance, throughput cycling, partial state of charge, usable capacity for cycling, weight to performance ratio, high heat performance, cold temperature performance, and sustained performance. In some examples, additional factors may also be considered. The factors may be weighted equally when determining the performance rating, or some factors may have a higher weight (e.g., more impact on the performance rating). In addition to the performance factors, factors related to safety, sustainability, regulatory compliance, autonomy, and complexity may also be considered. The color ranges and/or the shades used within each color range may also be based on initial release date of each product (or a predecessor of a product). For example, flooded lead acid batteries were released before AGM batteries, so the flooded lead acid batteries are further to the left of the color spectrum. Additionally, a performance rating of batteries in different product ranges may be similar, but the batteries may have different uses. For example, a performance rating of a lithium-ion battery may be similar to a performance rating or, for example, the improved cycling AGM battery. However, the color range based on product group or range will take precedence over the performance rating. For example, the color of the cover of the lithium-ion battery is still within the color range of the lithium-ion product group and not within the color range of the AGM batteries.

FIG. 7 depicts the color spectrum broken up into the three ranges that correspond to the product ranges. For example, the first color range may include yellow-to-orange and may correspond to flooded battery types. One battery in the range (e.g., a standard flooded battery) may be one shade (e.g., orange, Pantone 137) within the color range and a second battery in the range (e.g., an Enhanced Flooded Battery (EFB)) may be a second shade (e.g., yellow, Pantone 109) within the color range. In particular, the first color range includes a gradient between Pantone 109 and Pantone 137 and may include additional colors or Pantone colors positioned between Pantone 109 and Pantone 137 on a color scale or gradient between yellow and orange. The second color range may include red-to-purple and may correspond to an AGM battery range. Different batteries in the AGM battery range may be different shades within the second color range, as depicted in the attached figures. Specifically, a current AGM battery may be red (Pantone 1788), a safety integrity battery may be a darker red (e.g., Pantone 199), a high-density AGM battery may be burgundy (e.g., Pantone 221), and an improved cycling AGM battery may be purple (e.g., Pantone 2617). In particular, the second color range includes a gradient between Pantone 1788 and Pantone 2617 and may include additional colors or Pantone colors (e.g., Pantone 199, Pantone 221) positioned between Pantone 1788 and Pantone 2617 on a color scale or gradient between red and purple. The third color range may include dark blue-to-light blue and corresponds to a Lithium-ion battery range. Different shades of blue indicate different batteries in the lithium-ion product range, as depicted in the attached figures. Specifically, a 48 V lithium-ion battery may be dark blue (e.g., Pantone 2746) and a 12 V lithium-ion battery may be light blue (e.g., Pantone 313). Additional future products may be a different shade in the appropriate color range for the product, with the shade selected based on the performance rating of the additional product. For example, a 36 V lithium-ion battery may have a cover with a color between the light blue and the dark blue colors. Future products that may replace current products are given the same shade or color of the product being replaced. For example, a next generation improved cycling AGM battery may replace the current improved cycling AGM battery and will have a purple (e.g., Pantone 2617) cover. In particular, the third color range includes a gradient between Pantone 2746 and Pantone 313 and may include additional colors or Pantone colors positioned between Pantone 2746 and Pantone 313 on a color scale or gradient between dark blue and light blue.

Pantone colors are a universal way to identify colors across multiple media types (e.g., graphics, print, coatings, and pigments, etc.). Each Pantone color is assigned an individual and unique number. Suffixes (e.g., letters at the end of the Pantone number) can identify other aspects of a physical color chip (e.g., coated (C), uncoated (P)). The Pantone colors can each be defined using Cyan Magenta Yellow Black (CMYK) values, Red Green Blue (RGB) values, and Hex values. The CMYK values may be useful for printing because the four colors (cyan, magenta, yellow, and black) are used in color printing. The RGB values may be used for digital media, such as TV, video cameras, image scanners, digital displays (computer displays, mobile displays, projectors, etc.). The Hex value or code is a 24-bit RGB color scheme that may be used in web design or development.

The example color spectrum described herein may be unique to a specific company or manufacturer. Thus, the consumer would not only be able to identify that a battery with a specific color of a cover would be a replacement for an existing battery, but also would be able to quickly identify the battery with a specific color of a cover is made by a certain company or manufacturer. Thus, a consumer would identify a cover with a color within the range of colors depicted in FIGS. 6 and 7, as well as the specific Pantone colors identified, as being a product of the company or manufacturer. Further, other Pantone colors not identified, but within the depicted color spectrum, may also be associated with products of the company. While there may be many Pantone colors within the depicted color spectrum, many of the over two thousand (2000) Pantone colors are not within identified the color spectrum and may be used for other products.

FIGS. 8-16 depict example constructions for battery housings having colored covers. The example battery covers are color-coded according to the color spectrum depicted in FIGS. 6 and 7 and described above. The batteries also include cases in which a plurality of battery cells is positioned. The example batteries may be used in vehicles of any type or may be used for other applications. The example covers are primarily manufactured using plastic and may be injection molded. The example covers are made from a different color of material than the example bases of the batteries. The example covers are different colors based on type of battery. Color-coding the battery covers helps a consumer, a retailer, service associate, or store associate identify the correct battery in the vehicle (or other application) and on the shelf. For example, the user may be able to determine the type of battery based merely on the color of the cover and may not need to remove the battery from the vehicle to find an appropriate replacement battery. Thus, color coding the covers of the batteries enables easier replacement of a used battery. Additionally, the different colored battery covers can act as a check to reduce the likelihood that an incorrect battery is accidently picked off the shelf by a user because, for example, it was not in the correct position on the shelf. That is, the user would be able to quickly identify whether the correct type of battery is being selected and installed in the vehicle or other application. It is important that the correct battery or battery type is selected for installation in the vehicle. Choosing the wrong battery can cause damage to the vehicle and/or the battery and can affect the life of the vehicle and/or the battery. The color-coded battery covers described herein facilitate selection of the correct battery, which may prevent damage to the vehicle. It is important that the correct battery is chosen as not all batteries, even batteries within the same type or group, are compatible with a vehicle. For example, each battery has a different combination of characteristics (e.g., charge acceptance, throughput cycling, partial state of charge, usable capacity for cycling, weight to performance ratio, high heat performance, cold temperature performance, sustained performance, etc.) related to performance, which can also affect the overall performance or lifespan of the vehicle. Further, batteries may have different voltage outputs, which would affect the compatibility of the battery with a vehicle. Thus, it is important the correct battery is installed in a vehicle.

Figure 10:
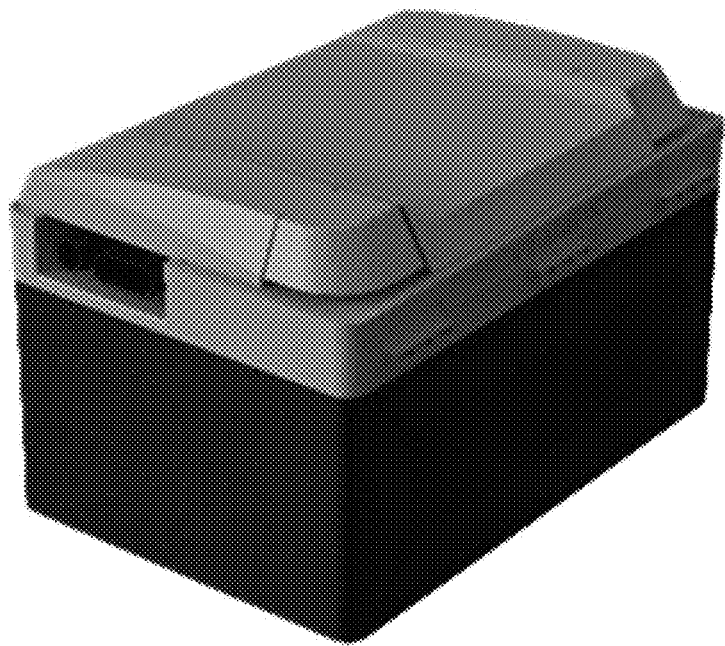
FIG. 10 depicts a second construction of a battery having a cover based on the color system of FIGS. 6 and 7.
Figure 11:
FIG. 11 depicts an alternative view of the second construction of the battery of FIG. 10.
Figure 12:
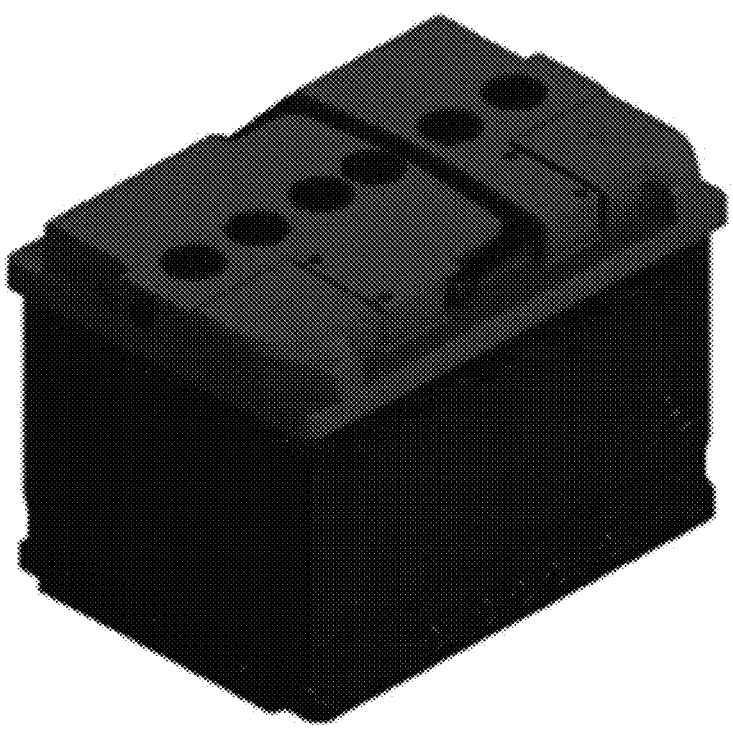
FIG. 12 depicts a third construction of a battery having a cover based on the color system of FIGS. 6 and 7.
Figure 13:
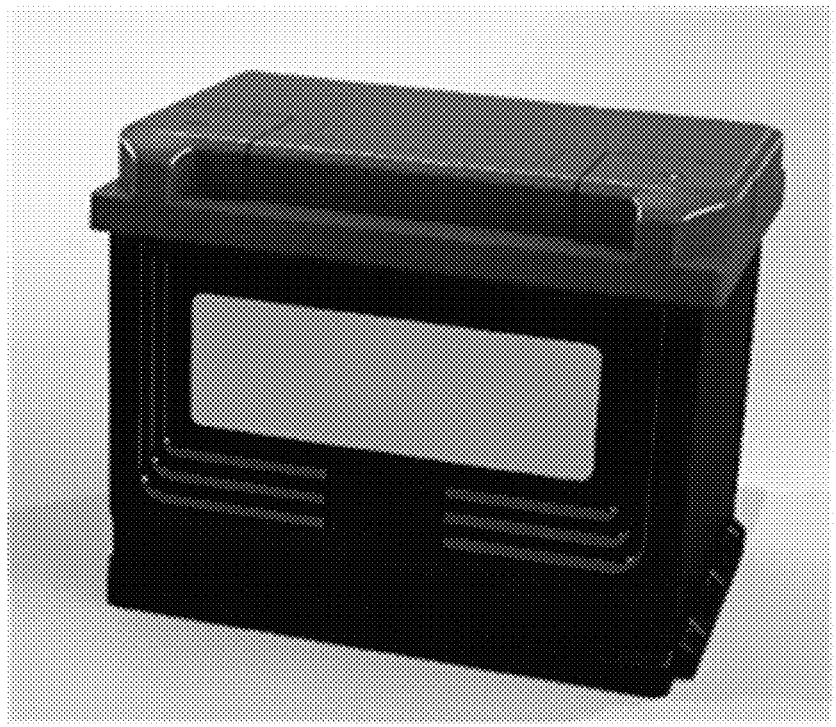
FIG. 13 depicts a fourth construction of a battery having a cover based on the color system of FIGS. 6 and 7.
Figure 14:
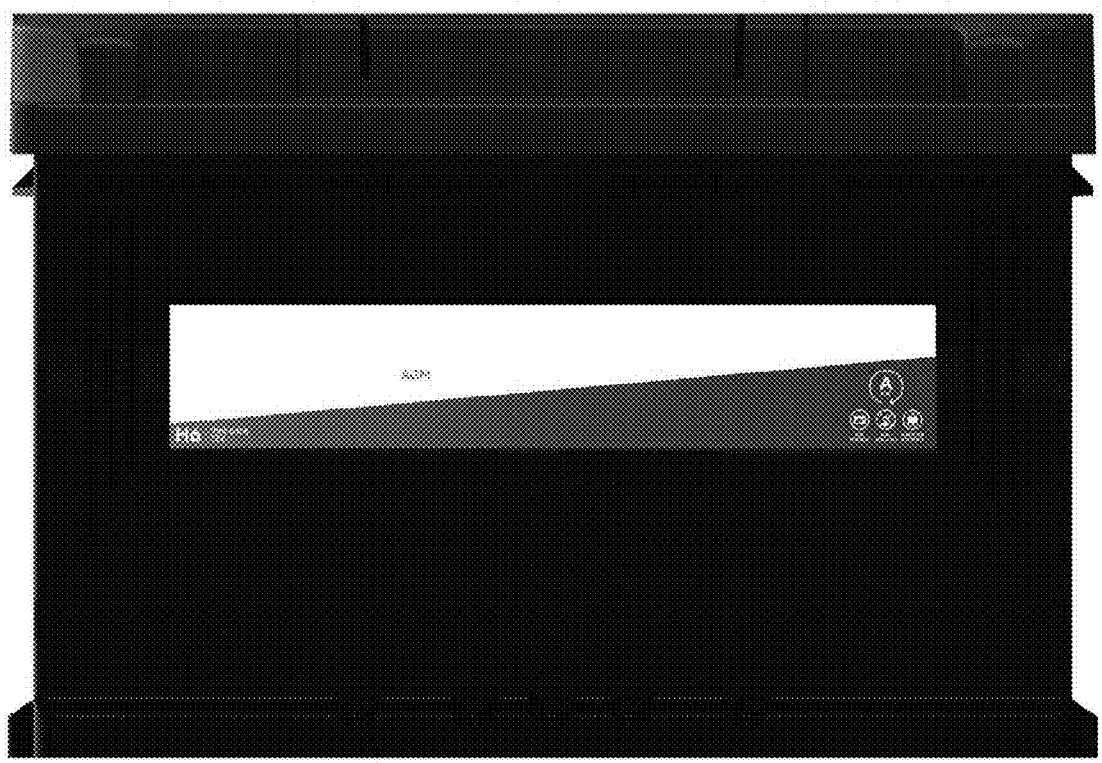
FIG. 14 depicts an alternative view of the fourth construction of the battery of FIG. 13.
Figure 15:
FIG. 15 depicts a fifth construction of a battery having a cover based on the color system of FIGS. 6 and 7.
Figure 16:
FIG. 16 depicts a sixth construction of a battery having a cover based on the color system of FIGS. 6 and 7.

In the illustrated examples, a battery (e.g., the battery in FIG. 8) with a cover of a first color (e.g., red, specifically Pantone 199) has features different from a battery (e.g., the battery in FIG. 9) with a cover of a second color (e.g., blue, Pantone 313). For example, certain colors indicate that the battery is a lead-acid battery, while other colors indicate that the battery is a lithium-ion battery. For example, batteries with yellow or orange covers may be flooded (e.g., wet cell) batteries, batteries with red or purple (e.g., Pantone 2617) covers may be absorbed glass matt (AGM) batteries. For example, FIGS. 10 and 11 depict different sizes of AGM batteries. Batteries with blue covers may be lithium-ion batteries. Additionally, within the color groups, the shade of the color may vary based on other features (e.g., amp hours, a performance rating, like charge acceptance, safety monitoring, etc.). One particular color scheme or color spectrum may be organized based on the product portfolio. In the illustrated product portfolio color system, lead acid batteries have covers in the yellow and orange color ranges or shades. Specifically, the covers for a standard lead acid battery may be Pantone 137 (e.g., orange) and the covers for an Enhanced Flooded Battery may be Pantone 109 (EFB) (e.g., yellow). AGM batteries may have covers in the red and purple color ranges or shades. In particular, the covers for an AGM battery currently in use may be Pantone 1788 (e.g., red), the covers for a safety integrity AGM battery (e.g., the battery depicted in FIGS. 8 and 9) may be Pantone 199 (e.g., dark red), the covers for a high density AGM battery may be Pantone 221 (e.g., burgundy), and the covers for an improved cycling AGM battery (e.g., the battery depicted in FIGS. 12-14) may be Pantone 2617 (e.g., purple). Lithium-ion batteries may have covers in the blue color range and shades. In particular, the cover for a 48V lithium-ion battery may be Pantone 2746 (e.g., dark blue) and the cover for a 12 V lithium-ion battery (e.g., the battery depicted in FIGS. 10 and 11) may be Pantone 313 (e.g., light blue). The color scheme or spectrum represented by the figures is only one possible color spectrum. Other color spectrum may be used to color-code the battery covers.

In some examples, the cover may include terminal caps and/or a handle that are also the same color as the cover. Additionally, one or more labels on one or more facings or sides of the battery has a color corresponding to the color of the cover. The example battery in FIG. 9 includes a label on a front facing that includes a dark red (e.g., Pantone 199) portion. The example battery in FIG. 11 includes a label on a front facing that includes a light blue (e.g., Pantone 313) portion. In some examples, the one or more labels includes a depiction of a gradient of the color range corresponding to the product range in which the product belongs. For example, the battery in FIG. 14 includes a label on a front facing that includes the red-to-purple gradient that corresponds to the AGM product group.

One or more of the disclosed embodiments, alone or in combination, may provide one or more technical effects, including easy battery type identification. Specifically, the color-coded battery system enables selection of the correct or appropriate battery for a vehicle, which prevents or avoids damage that may occur when the wrong battery is installed in a vehicle. The technical effects and technical problems in the specification are exemplary and are not limiting. It should be noted that the embodiments described in the specification may have other technical effects and can solve other technical problems.

The color-coding described above has utility and advantages when used in automated or partly automated inventory, storage, evaluation, maintenance, refurbishment, recharging, processing, recycling and disposal environments, as well as environments where batteries are moved in large numbers and/or high speeds through the environments. FIGS. 17-20 illustrate these features described herein below.

Figure 17:
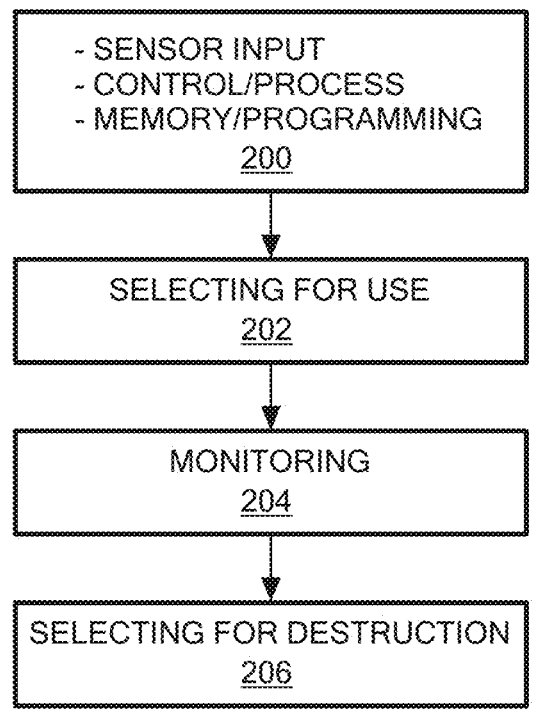
FIG. 17 is a flow chart for a system of using color-coding to manage batteries.

The color-coding described above can be incorporated in a system 200 having a processor for managing a color-coded battery as set forth in FIG. 17, wherein the processor, e.g., system processor, is configured to select a color-coded battery for use based upon color in a step 202; monitor the life cycle of the color-coded battery based upon color in a step 204; and select a color-coded battery for recycling or destruction based upon color in a step 206. The system further includes input and output interfaces for sensors and other peripheral equipment such as keyboards, microphones, displays, as well as memory for storing programming and data accessed and processed by the system processor, in addition to components that can lift, manipulate, and move color-coded batteries, as well as perform various tests, monitor, repair, recondition, or dispose the color-coded batteries in response to processor controlled system commands.

Figure 18:
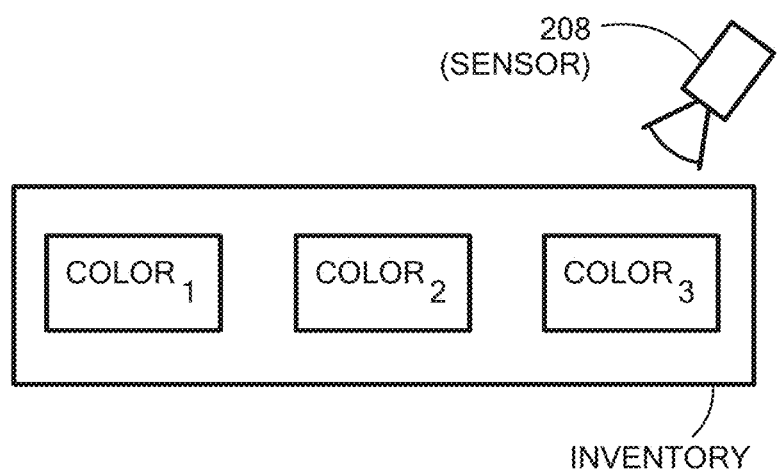
FIG. 18 depicts color-coded batteries in accordance with the invention processed with a color detector.

In the selection step 202, user requirements are identified, and color-coded batteries, shown in FIG. 18, are associated with specific battery use requirements as described above. Batteries are provided having color-coding, for convenience in the drawings labeled color 1, color 2, and color 3. Batteries are identified by color-coding for partitioning and, when appropriate, destruction. A selection algorithm selects a specific color-coded battery from the group of color-coded batteries that meets the user requirements. An optical sensor 208 is provided that can detect color (a single color or multiple colors) and the selected battery is removed from inventory for use or delivery having been identified by the optical sensor.

A battery management facility may store, process, repair, recycle or destroy batteries. An important part of battery management includes monitoring battery performance characteristics related to the life cycle of the battery. Specifically, it is important to know where a battery is in its life cycle. For example, how much longer can the battery perform its intended function? Is the battery at its end of performance life? Can the battery be recycled?

Thus, the system 200 identifies a battery value (or accepts the input of a battery value to be monitored) in step 204 monitors the battery value. A color-code corresponds to the battery value. As described above, color-coding can be used to designate a particular battery use environment or performance characteristic. However, when monitoring battery life cycle, evaluation of the electrochemical performance of the battery as a whole or cell by cell can be valuable, as well as monitoring the age of the battery. Further, it can be useful to color-code to indicate the inclusion in the battery of additional components, wires, circuits, or other features.

Figure 19:
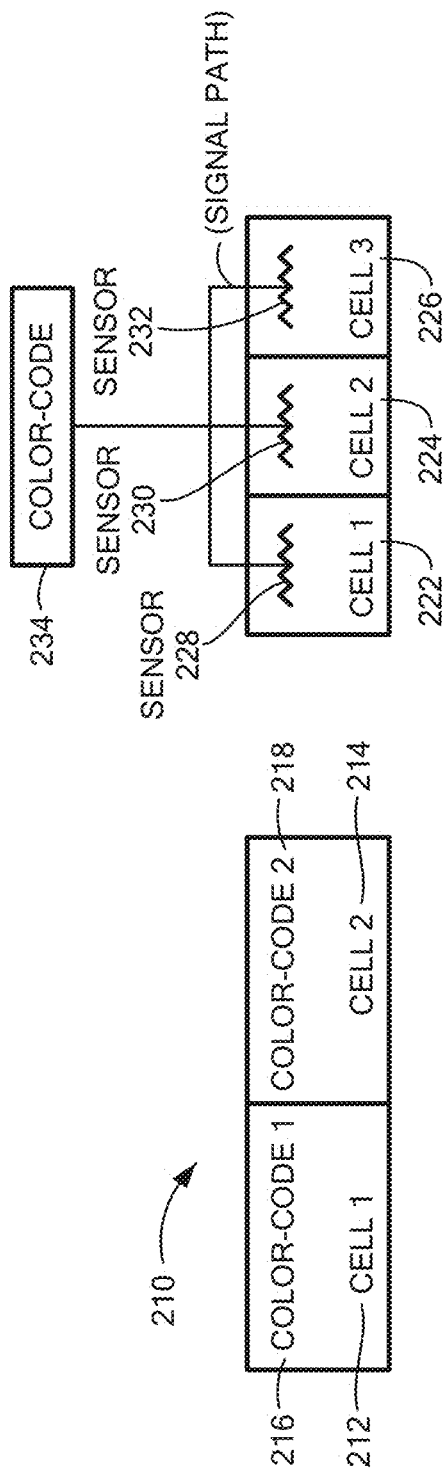
FIG. 19 illustrates color coding for multi-cell lead-acid batteries.

FIG. 19 depicts two batteries having multiple cells, wherein a battery value is monitored for each cell, but color is displayed differently. For example, a battery 210 is shown having a first cell 212 and a second cell 214. A two-cell configuration is shown for simplicity of explanation, however, the battery 210 can have many more cells as described above. A first color-code 216 is displayed that represents a battery value for the first cell 212 and a second color-code 218 is displayed that represents a battery value for the second cell 214. The battery value can be voltage, wherein each cell is provided with a voltage sensor in communication with a color-code display such as a monochrome or multi-color capable LED, LED array, or video screen. The color-code display can be as simple as "on" or visible or "off" or not visible. Alternatively, the color can switch from one color to a different color. For example, red could represent a first battery value and the green could represent a second battery value. Yet still, the battery value can be represented by many colors, such as a spectrum. For example, a battery value could progress from a first value to a second value with a range of colors representing transition points from the first value to the second value. Similarly, the color can fade or intensify depending upon the battery value. For example, in addition to sensed electrical values, the color can change, fade, or intensify based upon a computation of duty cycles, thermal cycles, number of max load events, number of maximum thermal cycles, a chronological battery age or an expiration date.

In a different configuration, a battery 220 is shown having a first cell 222, a second cell 224, and a third cell 226. A first color-code 228 is displayed that represents a battery value for the first cell 222, a second color-code 230 is displayed that represents a battery value for the second cell 224, and a third color-code 232 is displayed that represents a battery value for the third cell 226. A summary color-code 234 is displayed that provides an overall battery value based upon the values of all of the individual cells. In one configuration, color-codes are not displayed with respect to individual cells, and only the summary color-code is displayed based upon sensed battery values in the individual cells.

Turning now to another function of the system, color-coding may be used to guide battery processing. An example of battery processing can be selection of batteries for destruction or recycling. In one situation, mixed battery types (lead-acid and lithium ion) are processed in the same autonomous or semi-autonomous facility. Each battery type requires completely different processing and inadvertent disassembly and processing of a lithium-ion battery as if it were a lead-acid battery can be dangerous. Similarly, batteries of different size and capacity of the same type still might be routed differently in the processing facility. Facilities that handle large numbers of batteries at high processing speeds benefit particularly from processing based upon color-codes.

Figure 20:
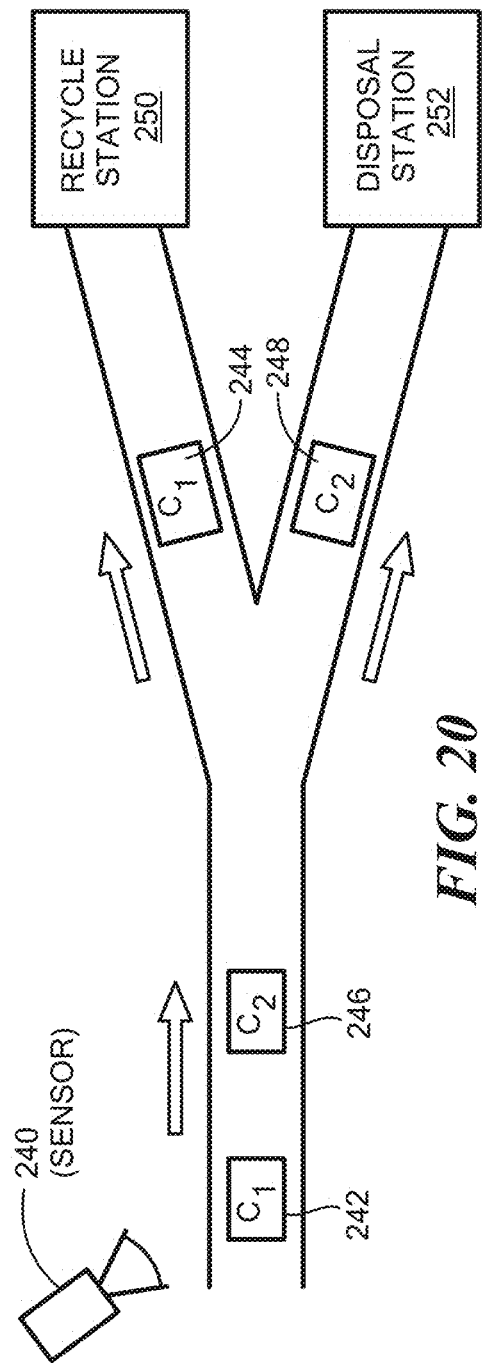
FIG. 20 depicts a system according to the invention with process control for color-coded batteries.

Referring to FIG. 20, a processing station 236 is shown having a conveyor 238 for moving batteries. An optical sensor or machine vision component 240 is provided in a location to sense the color of color-coded batteries. In the illustration, batteries 242 and 244 are shown having a first color-code and batteries 246 and 248 are shown having a second color-code. The system processor is directing batteries 242 and 244 to a recycling station 250 and batteries 246 and 248 to a destruction or disposal station 252. Although the system is shown processing two groups of color-coded batteries, additional groups of color-coded batteries can be processed, and more processing stations can be provided.

Further, it should be noted that the system does not need to handle all above-described functions. For example, the system can be used for inventory management alone, as a stand-alone battery monitoring system, and/or a disposal and recycling system, wherein color-coding is used to select, monitor, and process batteries.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are within the scope of the invention as recited in the appended claims.

It should be noted that references to relative positions (e.g., "top" and "bottom") in this description are merely used to identify various elements as are oriented in the Figures. It should be recognized that the orientation of components may vary greatly depending on the application in which they are used.

For the purpose of this disclosure, the term "coupled" means the joining of two members directly or indirectly to one another. Such joining may be stationary in nature or moveable in nature. Such joining may be achieved with the two members, or the two members and any additional intermediate members being integrally formed as a single unitary body with one another or with the two members or the two members and any additional intermediate members being attached to one another. Such joining may be permanent in nature or may be removable or releasable in nature.

It is also noted that the construction and arrangement of the system, methods, and devices as shown in the various examples of embodiments is illustrative only, and not limiting. Although only a few embodiments have been described in detail in this disclosure, those skilled in the art who review this disclosure will readily appreciate that many various alternatives, modifications, variations, improvements and/or substantial equivalents, whether known or that are or may be presently foreseen, are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes, and omissions may be made in the design, operating conditions, and arrangement of the various examples of embodiments without departing from the spirit or scope of the present inventions. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A system for managing a color-coded battery, the system comprising a processor configured to:
   select a color-coded battery from a plurality of color-coded batteries for use based upon color, color for the color-coding being based on a color on a label affixed to the battery associated with a specific battery use, and the plurality of color-coded batteries including batteries having differently colored labels, the selecting including:
      determining user requirements; and
      applying a selection algorithm to select a specific color-coded battery from the plurality of color-coded batteries that meets the user requirements;
   monitor the life cycle of the color-coded battery based upon color; and
   select a color-coded battery for recycling or disposal based upon color.

2. The system of claim 1, wherein monitoring the life cycle of a battery includes:
   identifying a battery value to be monitored;
   monitoring the battery value; and
   displaying a color-code corresponding to the battery value.

3. The system of claim 2, wherein the battery includes at least two lead-acid cells and wherein monitoring the battery value includes individually monitoring the at least two lead-acid cells to provide a cell value for each lead-acid cell.

4. The system of claim 3, wherein a color-code is assigned to each of the cells and is displayed according to each cell value.

5. The system of claim 3, wherein a single color-code for the battery is displayed based upon the cell value of each lead-acid cell.

6. The system of claim 2, wherein the color can fade in intensity corresponding to a change in the battery value.

7. The system of claim 1, further including an optical sensor configured to identify color.

8. The system of claim 7, wherein the optical sensor is configured to identify a specific color.

9. The system of claim 7, wherein the optical sensor is configured to identify a plurality of colors.

10. The system of claim 1, wherein the color indicates a specific color-coded battery model.

11. The system of claim 1, wherein the color indicates the presence of specific color-coded battery components.

12. The system of claim 1, wherein the color corresponds to a calendar date.

13. The system of claim 12, wherein the calendar date indicates color-coded battery end of useful life date.

14. A system for managing a color-coded battery, the system comprising a processor configured to:
   select a color-coded battery for use based upon color, color-coding for the color-coded battery being based on a color on a label affixed to the battery;
   monitor the life cycle of the color-coded battery based upon the color on the label; and
   select a color-coded battery for recycling or disposal based upon color, selecting the color-coded battery for disposal based upon color includes:
      determining a processing step based upon color-code;
      identifying the color-coded battery from a plurality of color-coded batteries; and
      performing a processing step for the color-coded battery.

15. The system of claim 14, wherein selecting a color-coded battery for use based upon color further includes separating the identified color-coded battery from the plurality of color-coded batteries.

16. The system of claim 15, wherein selecting a color-coded battery for use based upon color further includes directing the identified color-coded battery to one of a disposal and a recycling station.

17. A system for identifying a battery, the system including:
   a processor configured to:
      determine user requirements;

apply a selection algorithm to select a first color and a second color from a plurality of color-coded batteries that meets the user requirements where color is associated with a specific battery use and the plurality of color-coded batteries includes batteries having differently colored labels, the color-coding being based on a color on the label affixed to the battery;

select a first battery of a first type from the plurality of color-coded batteries, the first battery having a first feature corresponding to the first type, wherein the first feature has the first color to indicate the first battery is the first type; and select a second battery of a second type from the plurality of color-coded batteries, the second battery having a second feature corresponding to the second type, the second feature having the second color to indicate the second battery is the second type, the first color being based on a first performance rating, and the second color is based on a second performance rating, the second performance rating being higher than the first performance rating and the second color being further along a color spectrum than the first color;

monitor the life cycle of the first battery and the second battery based upon color; and select at least one color-coded battery for recycling or disposal based upon color.

18. The system of claim 17, wherein the first type of the first battery is in a first product range and the second type of the second battery is in a second product range.

19. The system of claim 17, wherein the first color is in a first range of a color spectrum and the second color is in a second range of the color spectrum, wherein the first and second ranges do not overlap.

20. The system of claim 17, wherein the processor is further configured to:

apply the selection algorithm to select a third color from the plurality of color-coded batteries that meets the user requirements where color is associated with a specific battery use and the plurality of color-coded batteries includes batteries having different colors;

select a third battery of a third type from the plurality of color-coded batteries, the third battery having a third feature corresponding to the third type, wherein the third feature has the third color to indicate the third battery is the third type, and wherein the third color is based on the first performance rating and the third battery is in the first performance rating and the first product range.

* * * * *